US007363703B2

(12) United States Patent
Imgrüt

(10) Patent No.: US 7,363,703 B2
(45) Date of Patent: Apr. 29, 2008

(54) DEVICE FOR FITTING ELECTRIC WIRES WITH SLEEVES

(75) Inventor: Peter Imgrüt, Baar (CH)

(73) Assignee: Komax Holding AG, Dierikon (CH)

( * ) Notice: Subject to any disclaimer, the term of this patent is extended or adjusted under 35 U.S.C. 154(b) by 161 days.

(21) Appl. No.: 11/346,944

(22) Filed: Feb. 3, 2006

(65) Prior Publication Data

US 2006/0174479 A1 Aug. 10, 2006

(30) Foreign Application Priority Data

Feb. 7, 2005 (EP) ................................ 05405058

(51) Int. Cl.
*B23P 19/00* (2006.01)

(52) U.S. Cl. ............................ 29/754; 29/235; 29/255

(58) Field of Classification Search ................. 29/747, 29/748, 749, 751, 754, 761, 828, 857, 861, 29/869; 110/93.2, 92.4; 100/29.3
See application file for complete search history.

(56) References Cited

U.S. PATENT DOCUMENTS

| | | | | |
|---|---|---|---|---|
| 4,653,182 | A * | 3/1987 | Fukuda et al. | 29/754 |
| 5,016,346 | A | 5/1991 | Gerst et al. | |
| 5,127,159 | A * | 7/1992 | Kudo et al. | 29/863 |
| 5,315,757 | A * | 5/1994 | Koch et al. | 29/754 |
| 5,432,996 | A * | 7/1995 | Imgrut et al. | 29/754 |
| 5,761,796 | A * | 6/1998 | Imgrut et al. | 29/748 |
| 6,289,573 | B1 * | 9/2001 | Imgrut | 29/564.4 |
| 6,393,684 | B2 * | 5/2002 | Masuda et al. | 29/235 |
| 6,401,331 | B1 * | 6/2002 | Mizuno | 29/771 |
| 6,990,730 | B2 * | 1/2006 | Fujita et al. | 29/749 |
| 7,243,415 | B2 * | 7/2007 | Revel et al. | 29/747 |
| 2006/0064870 | A1 * | 3/2006 | Furuya et al. | 29/747 |

FOREIGN PATENT DOCUMENTS

| | | |
|---|---|---|
| EP | 0 410 416 | 1/1991 |
| EP | 0 462 923 | 12/1991 |
| EP | 0 626 738 | 11/1994 |
| EP | 1 022 821 | 7/2000 |

* cited by examiner

*Primary Examiner*—Terrence R. Till
*Assistant Examiner*—Jossef Zilberman
(74) *Attorney, Agent, or Firm*—Fraser Clemens Martin & Miller LLC; William J. Clemens

(57) ABSTRACT

A sleeve-fitter includes a sleeve module, a fitting module, a control and a base module. The fitting module and control are part of the base module. In operation, a centering pin and a round hole cooperate when the sleeve module is in contact with the base module and the sleeve module can be separated from the base module by a lever. The sleeve module includes a sleeve container with a drum, a filling funnel with a cover, a support for accommodating sleeve-specific machine parts and/or tools, and a feeder rail arranged on a linear vibratory feeder. A drive arranged on the base module imparts rotational movement to the drum which then feeds sleeves onto the feeder rail. This sleeve-fitter results in short retooling times and therefore short downtimes.

16 Claims, 11 Drawing Sheets

FIG. 1.1
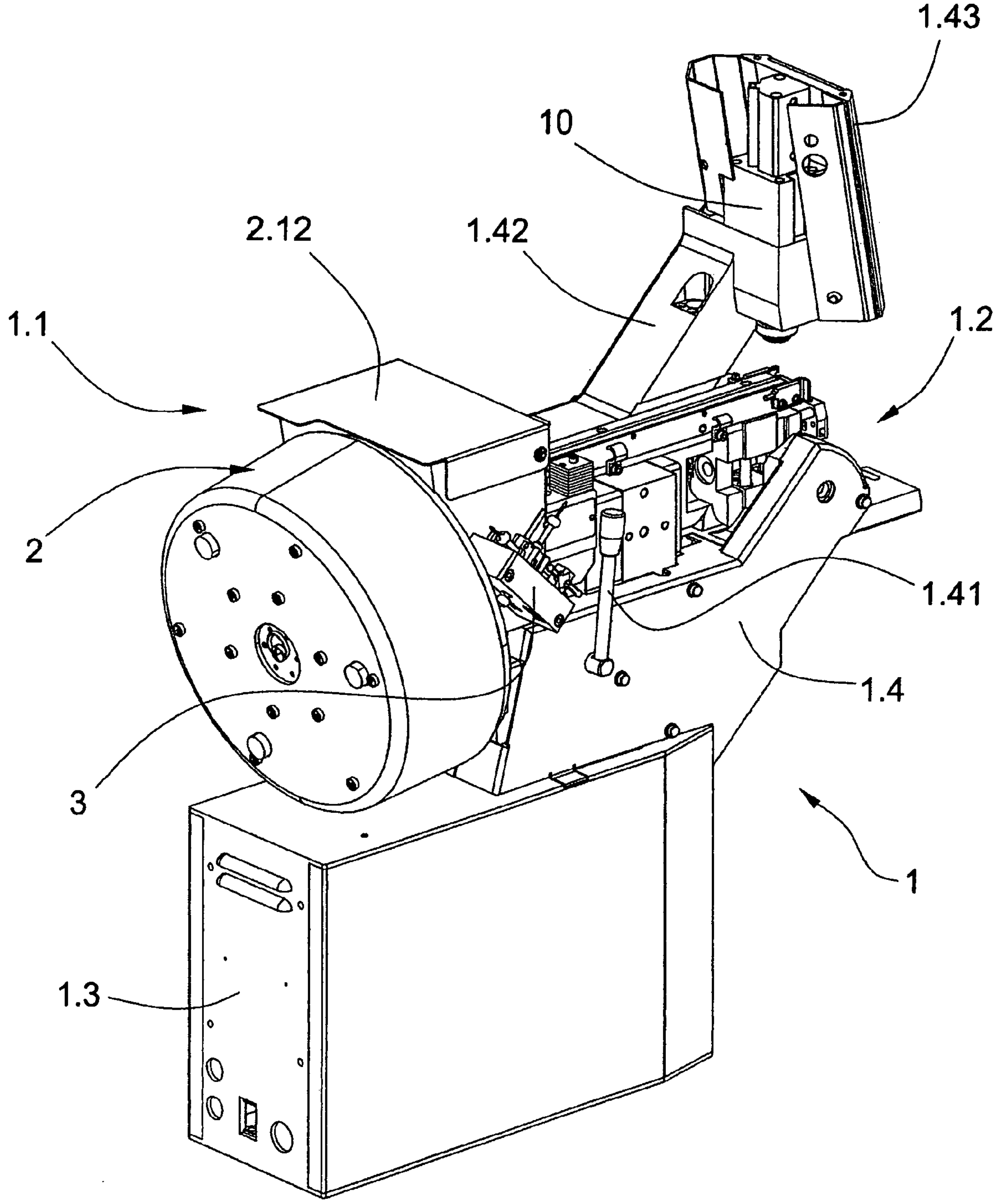

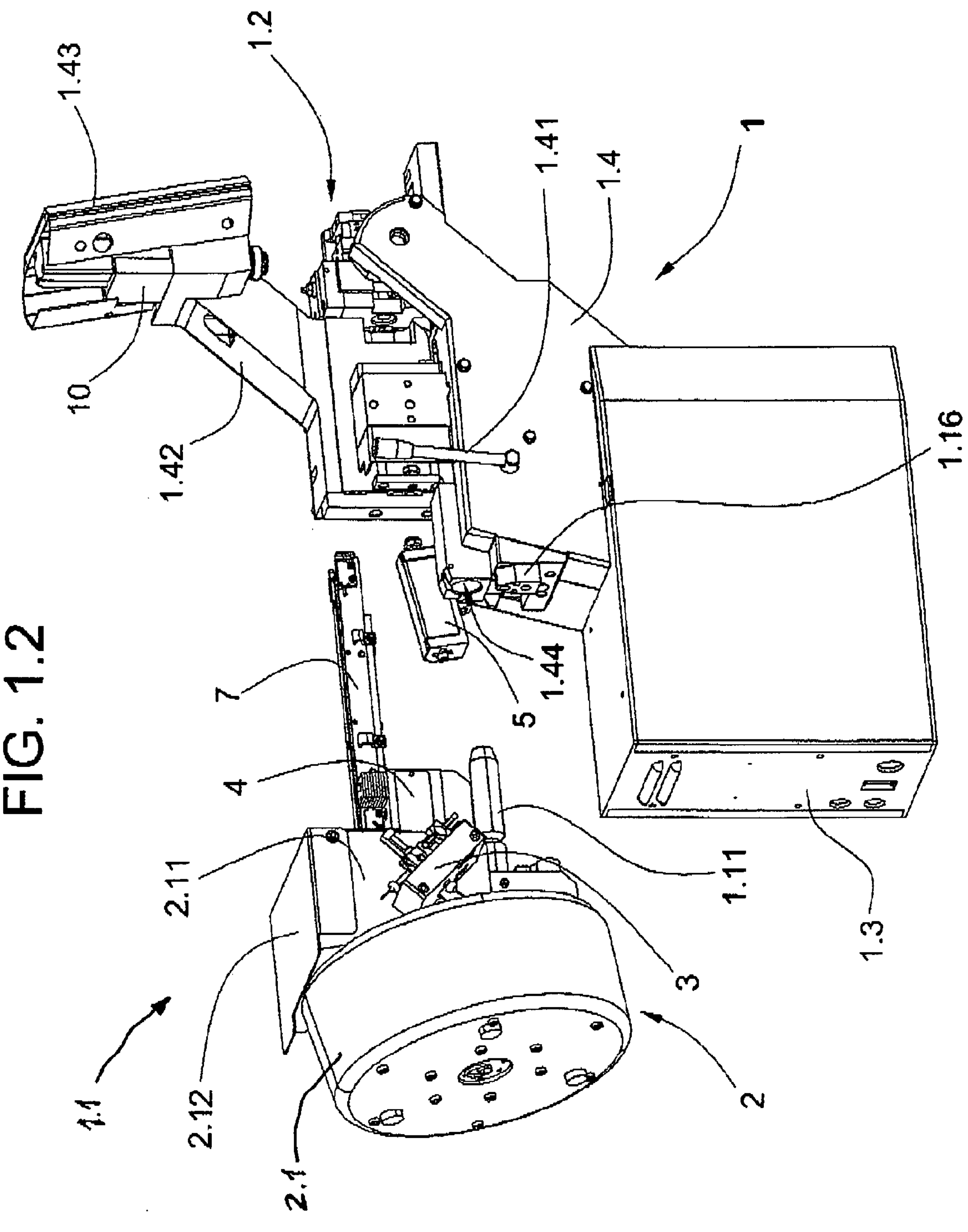
FIG. 1.2

FIG. 1.3
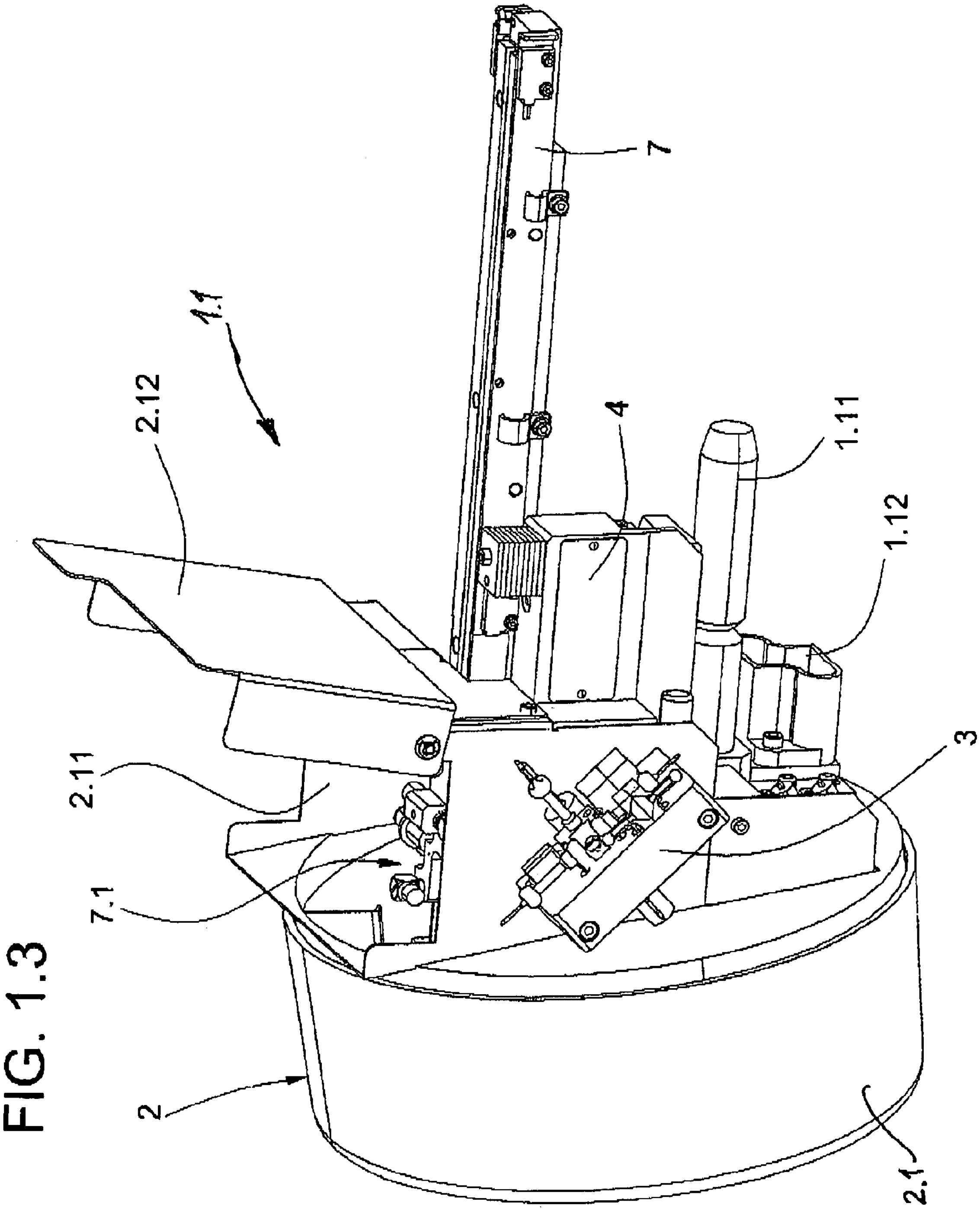

FIG. 1.4
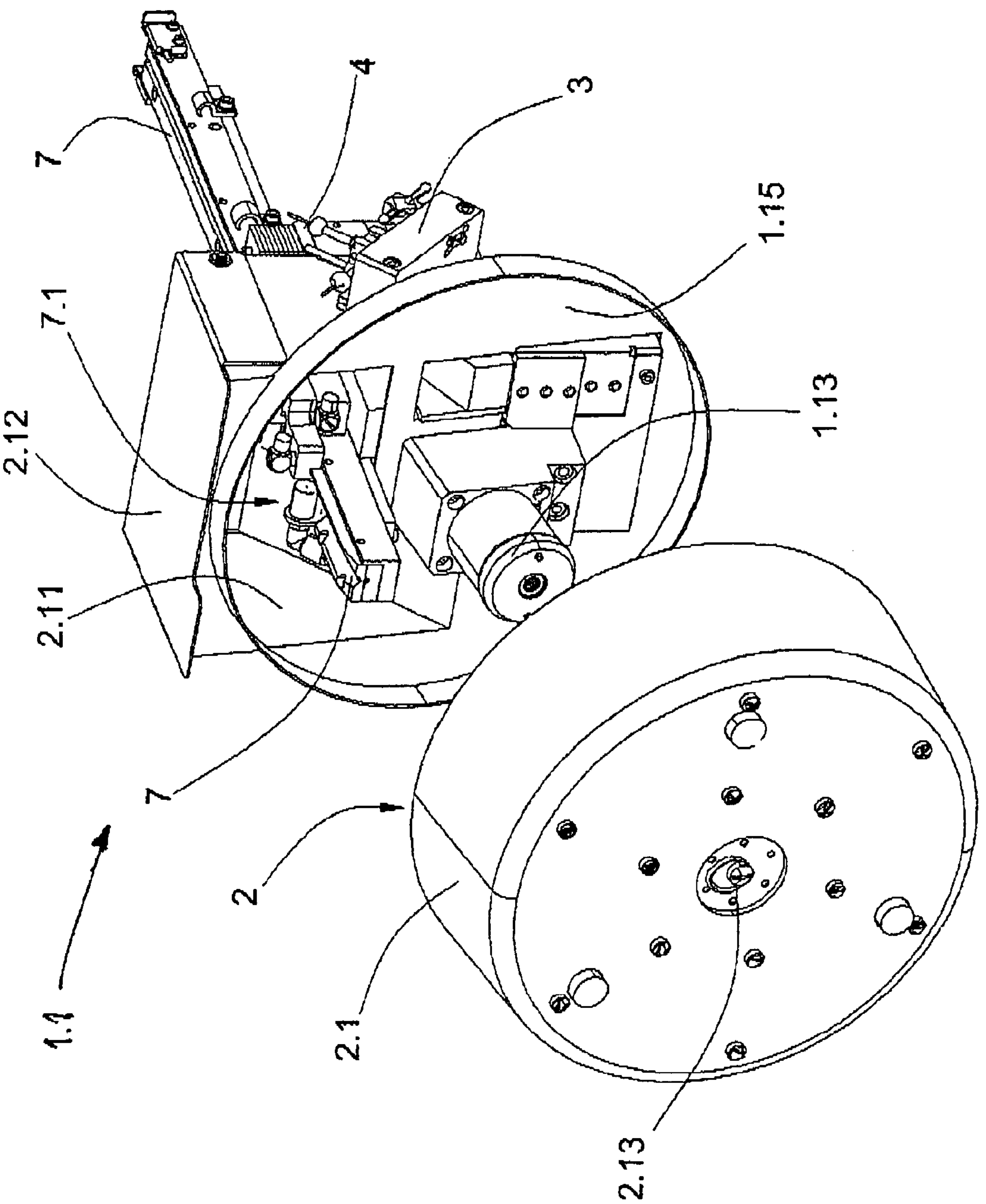

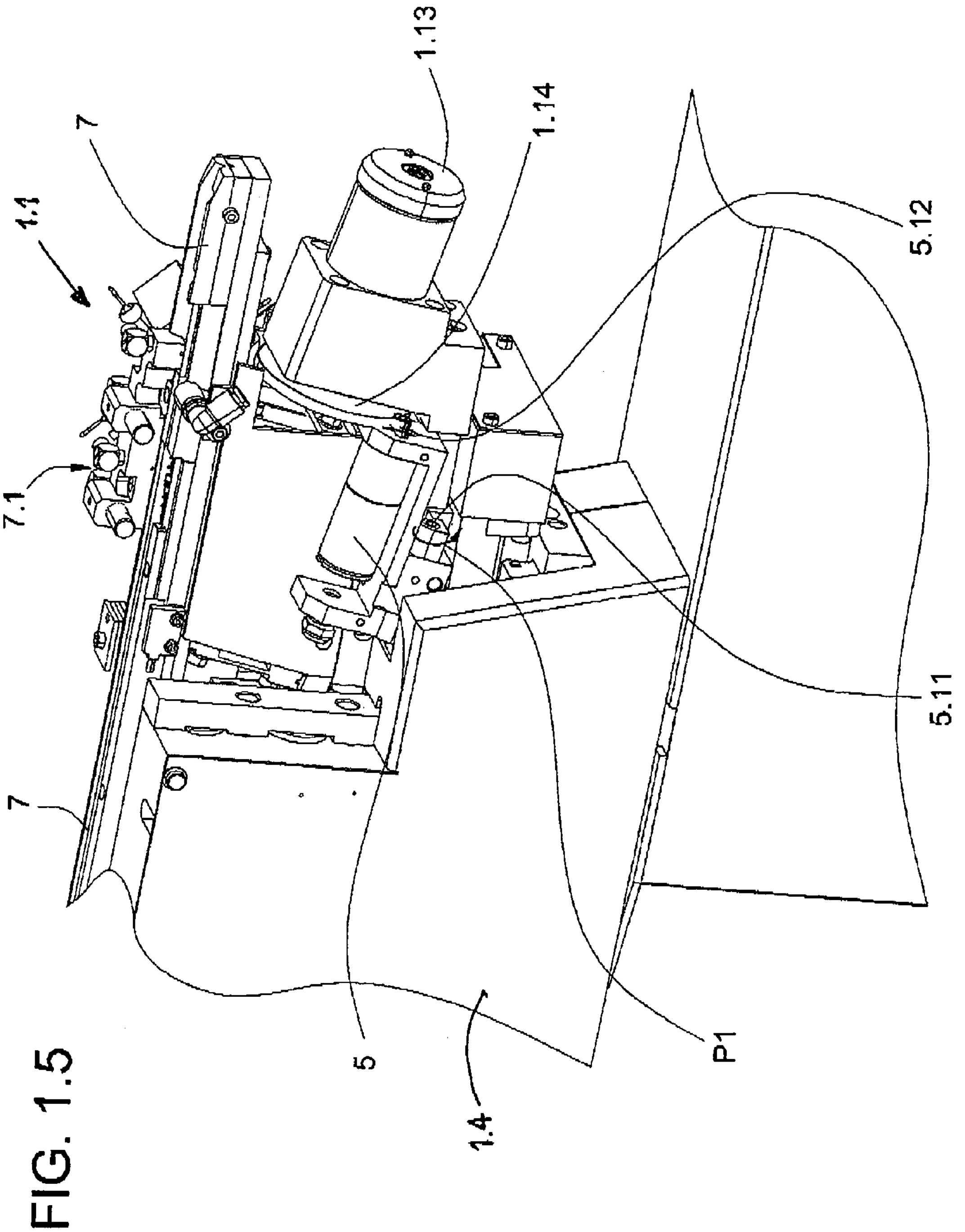
FIG. 1.5

FIG. 1.6
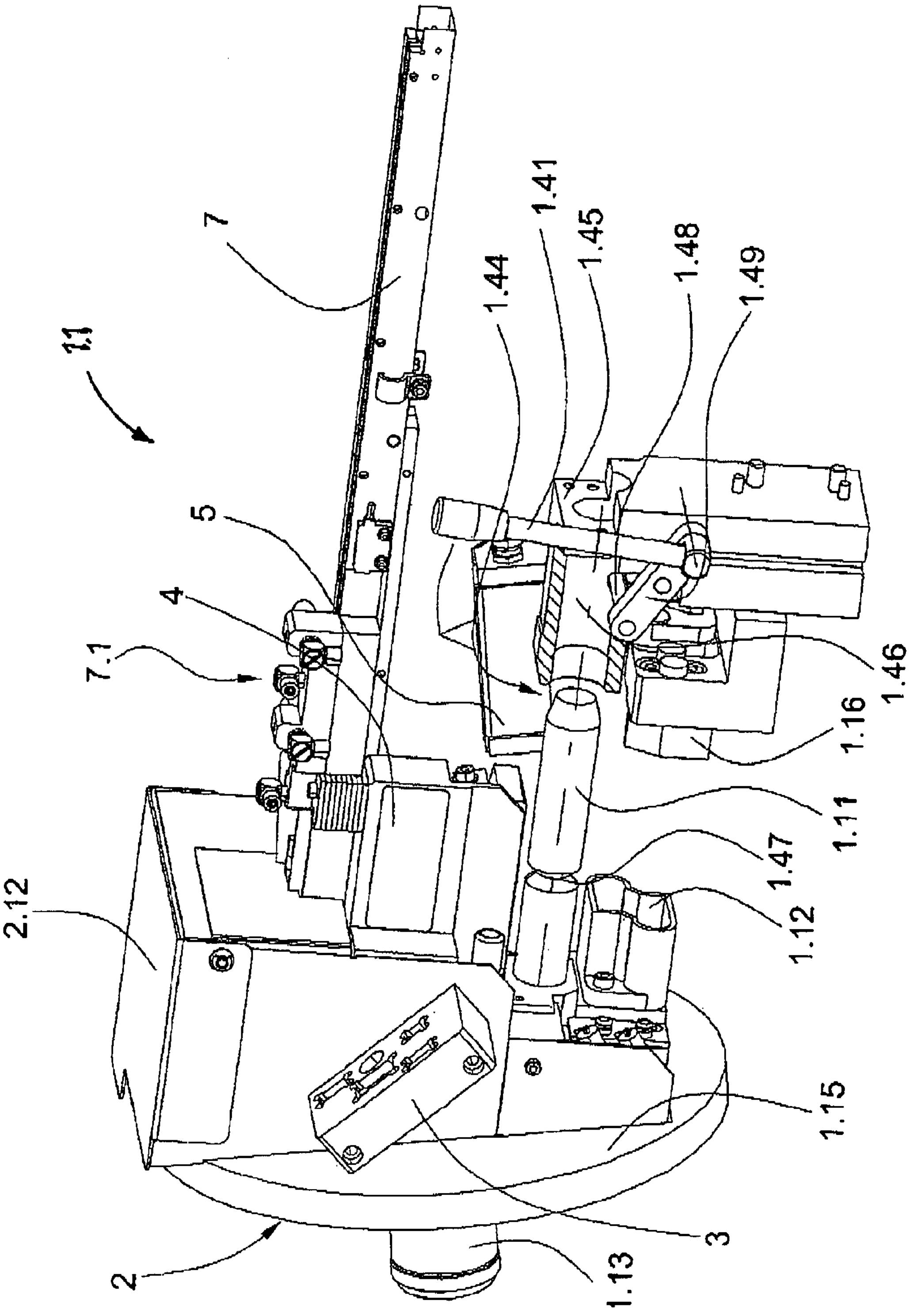

DEVICE FOR FITTING ELECTRIC WIRES WITH SLEEVES

BACKGROUND OF THE INVENTION

The present invention relates to a device for fitting electric wires with bushings or sleeves comprising a base module for supporting a sleeve module and a fitting module, wherein the sleeve module feeds to the fitting module the sleeves in the correct orientation for fitting and the fitting module fits the wire with the sleeves.

European patent specification EP 0 626 738 B1 shows a device for fitting sleeves onto electric wires. With such devices, sleeves which are needed, for example, for the moisture proof passage of electric wires through the walls of housings of electrical apparatus, can be pushed onto the wires in an efficient manner. The device consists of a drum that can be filled with sleeves and is open on one end-face and which can be driven about an axis that runs at an angle to the horizontal. While the drum rotates, sweepers arranged inside the drum pass to a feeder rail projecting into the drum sleeves for the purpose of buffering and further conveyance with correct orientation. An ejector device with a centering spindle that can be moved up and down feeds the first sleeve in the feeder rail of a rotating device which has several spindles and can be rotated further in stepwise manner by a certain angle, in a first position of the rotating device one sleeve is pushed onto the tip of a spindle. In a second position of the rotating device, for the purpose of its expansion the sleeve is pushed by means of a pushing unit onto a part of the spindle. In a further position of the rotating device, by means of a fitting head with sleeve receptacle and sleeve expander the sleeve is pulled off the spindle and the sleeve in expanded state is pushed onto the wire.

A disadvantage of this known device is that, when retooling the device from one sort of sleeve to another sort of sleeve, many sleeve-specific machine parts or tools must be exchanged, which causes long changeover times.

SUMMARY OF THE INVENTION

The present invention provides a solution to avoiding the disadvantages of the above-described known device with a device for fitting sleeves that can be retooled easily and quickly.

An advantage of the present invention is that when retooling the device, sources of error are ruled out. With the device according to the present invention, it is essentially no longer individual sleeve-specific parts or tools that are exchanged but sleeve-specific modules or sub-modules. By this means, the danger of confusion when retooling is drastically reduced. Furthermore, the retooling time and therefore the downtime of the machine when changing to another sort of sleeve are significantly shortened. The sleeve module for fitting sleeves onto the next lot of wires can be completely prepared while the current lot of wires is being fitted with sleeves. With short retooling times, even small lots of wires can be produced inexpensively.

DESCRIPTION OF THE DRAWINGS

The above, as well as other, advantages of the present invention will become readily apparent to those skilled in the art from the following detailed description of a preferred embodiment when considered in the light of the accompanying drawings in which:

FIG. 1.1 is a perspective view of a sleeve-fitting device according to the present invention;

FIG. 1.2 is a view similar to FIG. 1.1 with a separated sleeve module;

FIG. 1.3 is a perspective view of the sleeve module of FIG. 1.2 with an opened container cover;

FIG. 1.4 is a perspective view of the sleeve module of FIG. 1.2 with a removable sleeve container removed;

FIG. 1.5 is a perspective view of the sleeve module of FIG. 1.2 without the container;

FIG. 1.6 is perspective view of a receptacle for the sleeve module;

DESCRIPTION OF THE PREFERRED EMBODIMENT

Figure 2:
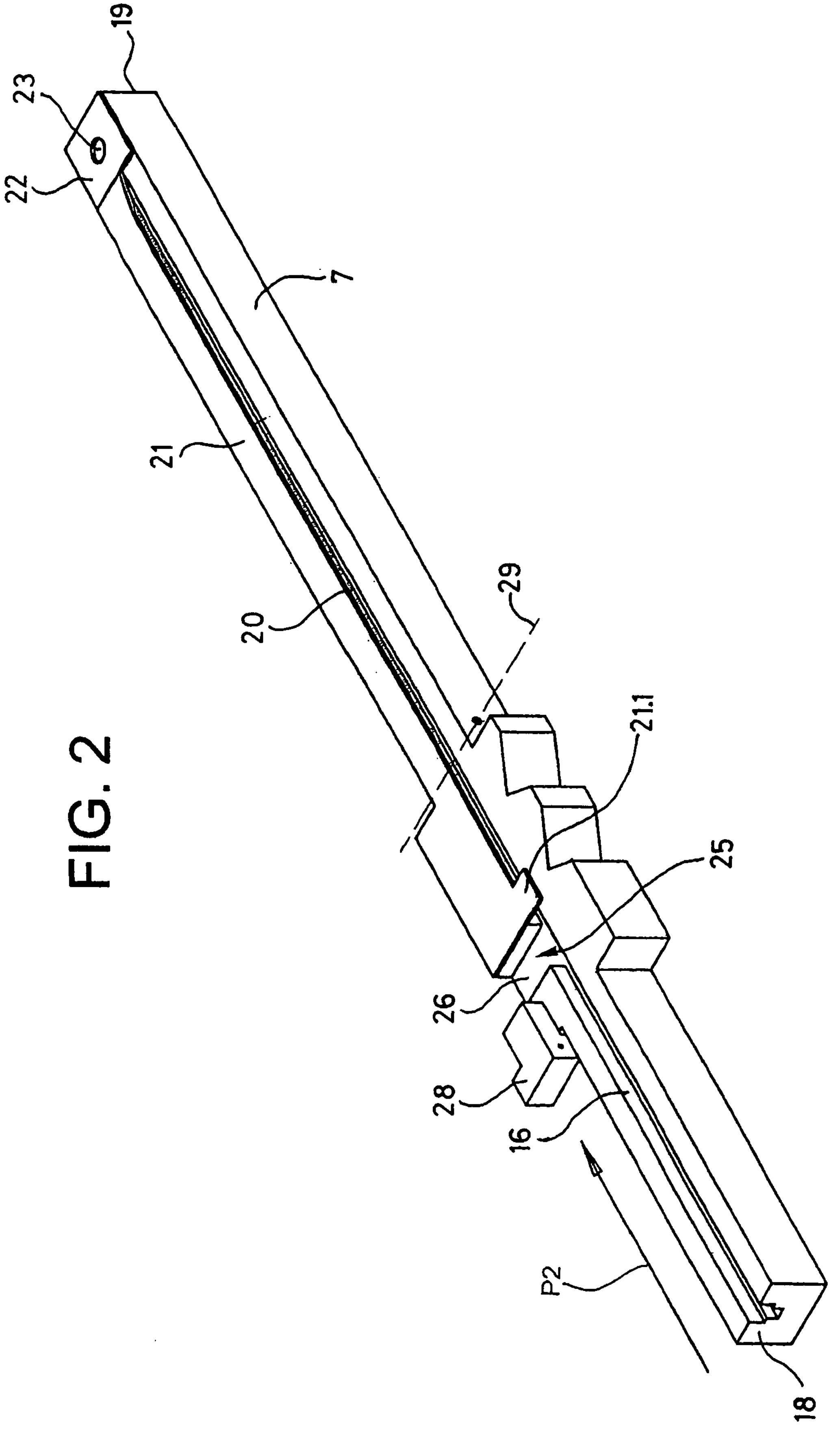
FIG. 2 is a feeder rail of the sleeve module of FIG. 1.2.

FIG. 1.1 shows a device for fitting sleeves according to the present invention, hereinafter referred to as the sleeve-fitter 1, comprising a sleeve module 1.1, a fitting module 1.2, a control 1.3, and a base module 1.4. The fitting module 1.2 and the control 1.3 are part of the base module 1.4. The sleeve module 1.1 can be separated from the base module 1.4 by means of a lever 1.41. Also arranged on the base module 1.4 is an arm 1.42 with an operating panel 1.43 and an ejector device 10.

FIG. 1.2 shows the sleeve-fitter 1 with the sleeve module 1.1 separated which, when in operation, is in contact with the base module 1.4 by means of a centering pin 1.11 serving as a guiding and holding device and which can be separated from the base module 1.4 by means of the lever 1.41. The sleeve module 1.1 essentially consists of a sleeve container 2 with a rotatable drum 2.1, a filling funnel 2.11 with a cover 2.12, a support 3 to accommodate sleeve-specific machine parts 11, 30, 31, 34, 41, 42 (shown in subsequent drawings), and/or tools and a feeder device consisting of a linear vibratory feeder 4 bearing a feeder rail 7. A drive 5 arranged on the base module 1.4 sets the drum 2.1 in rotational motion.

The feeder rail 7 is sleeve-specific and fits only sleeve types of identical geometry and different colors.

Arranged inside the drum 2.1 are feeder sweepers (not shown) by means of which sleeves 17 (FIG. 4*a*) for fitting onto electric wires can be fed to the feeder rail 7. The feeder rail 7 is shown in greater detail in FIG. 2 and projects through and into an open end-face of the sleeve container 2 at its higher end. The drum 2.1 is preferably made of transparent plastic so that optical inspection of the sleeve stock and of the feeding process is possible.

FIG. 1.3 shows the sleeve module 1.1 with the container cover 2.12 opened for charging the sleeve container 2. Arranged below the centering pin 1.11 is a female plug device 1.12 which connects pneumatic and electric lines of the sleeve module 1.1 via a male plug device 1.16 (FIG. 1.6) of the base module 1.4 with pneumatic and electric lines of the base module 1.4. As can be seen from FIG. 1.3, the dram 2.1 is arranged on the sleeve module 1.1 tipped slightly down relative to The feeder rail 7. Under the influence of gravity, the sleeves (not shown) in the drum always move toward the lower-lying end of the drum 2.1, the feeder sweepers emptying the drum down to the last sleeve and feeding them to the feeder rail 7 arranged at the higher-lying end of the drum 2.1.

FIG. 1.4 shows the sleeve module 1.1 with the drum 2.1 separated from the sleeve module 1.1. The drum 2.1 can be placed on a drive flange 1.13 of the sleeve module 1.1 and can be locked to the drive flange 1.13 by means of a quick-release fastener 2.13. As can be seen from FIG. 1.4, at the higher-lying end of the drum 2.1, one end of the feeder rail 7 projects into the drum 2.1. The sleeves (not shown) that are fed by means of the feeder sweepers onto the feeder rail 7 are sorted into correct orientation by a device 7.1, the incorrectly oriented sleeves being removed from the feeder rail 7 by being blown off.

FIG. 1.5 shows the sleeve module 1.1 without the sleeve container 2 and filling funnel 2.11 placed on the base module 1.4. As can be seen in FIG. 1.5, the drive 5 is mounted so as to be rotatable about an axis 5.11 in the direction of an arrow P1, the drive 5 being capable of swiveling against a spring force in the direction of the arrow P1. With the spring mounting of the drive 5, after changing the sleeve module 1.1 a pinion 5.12 engages automatically in the teeth of a gear wheel 1.14, the gear wheel 1.14 driving the drive flange 1.13.

The centering pin 1.11 (FIG. 1.3), the plug device 1.12 (FIG. 1.3), the drive flange 1.13, the gear wheel 1.14, the filling funnel 2.11 (FIG. 1.4), the support 3 (FIG. 1.4), and the vibratory feeder 4 (FIG. 1.4) are arranged on a housing 1.15 (FIG. 1.4) of the sleeve module 1.1. The housing 1.15 closes the drum 2.1 by means of a flange; together toy form the sleeve container 2.

FIG. 1.6 shows a receptacle 1.44 for receiving the centering pin 1.11. The receptacle 1.44 consists essentially of a housing 1.45 with a round hole 1.46 into which the centering pin 1.11 fits. Provided on the centering pin 1.11 is an annular notch 1.47 which receives a movable pin 1.48. The centering pin 1.11 is pushed into the round hole 1.46 until the notch 1.47 lies level with the pin 1.48. The pin 1.48 is then moved by means of the lever 1.41 and a lever linkage 1.49 into the notch 1.47, the releasable notch/pin connector pushing the sleeve module 1.1 into the correct axial position and holding it there. All electric and pneumatic lines are also connected (by means of the plug device 1.12, 1.16) when the centering pin 1.11 is pushed in.

As shown in FIG. 2, along its longitudinal axis the feeder rail 7 has a groove 16 whose cross section is approximately the same as the contour of the longitudinal section of the sleeve 17 (FIG. 4*a*-4*e*). At a farther end 18 of the feeder rail 7, the groove 16 is open, while at a front end 19 it is closed (FIG. 4*a*-4*e*). The front part of the groove 16 in a direction of feed P2 serves as a buffer 20 in which the sleeves are buffered with correct orientation and which is covered with a cover plate 21. The cover plate 21 half covers the groove 16, so that the buffered sleeves are visible. On the buffer run-in, the cover plate 21 has a projection 21.1 which completely covers the groove 16. The front end 19 of the feeder rail 7 is covered with a plate 22 in which a round hole 23 is provided whose axis coincides with the axis of the first sleeve in the buffer 20. Provided in the feeder rail 7 below the first sleeve in the buffer 20 is a vertical round hole 24 (FIG. 4*a*-4*e*) whose axis also coincides with the axis of the first sleeve, and whose diameter is smaller than that of the sleeve 17. Provided before the buffer run-in there is a sorting gate 25 with a recess 26 which interrupts the groove 16 on one side and a blowing-out nozzle that is not shown. A blowing-off nozzle before the sorting gate 25 is referenced with 28. Connected behind the buffer run-in is a light barrier which is not shown in greater detail whose light ray is symbolized by a chain-dotted line 29. For improved feed, the rail can be provided with several parallel round holes at an angle to the feeder device and opening into the feeder groove through which a continuously adjustable stream of air emerges.

Figure 3:
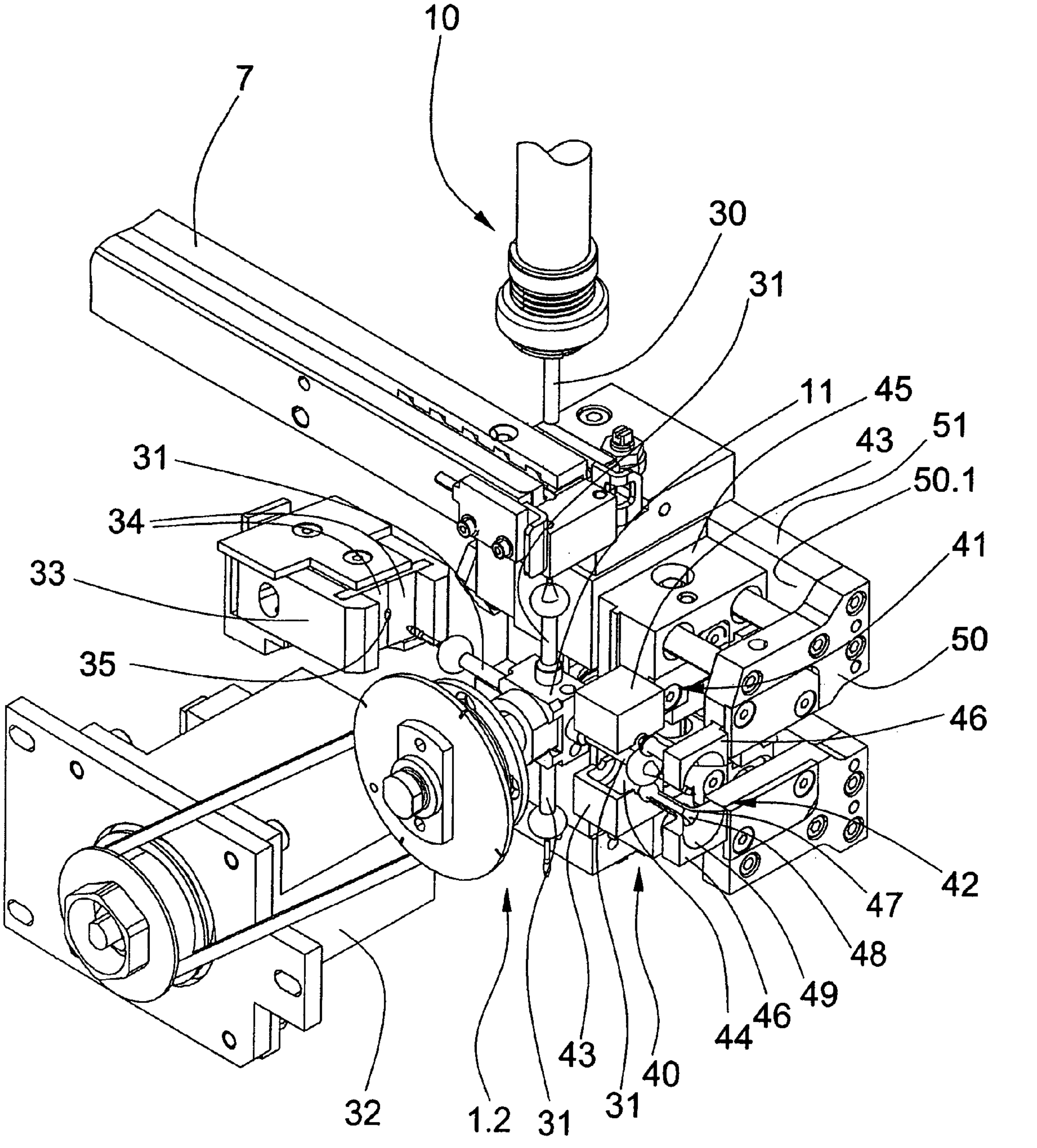
FIGS. 3 and 3*a* are perspective views of a fitting module.
Figure 3A:
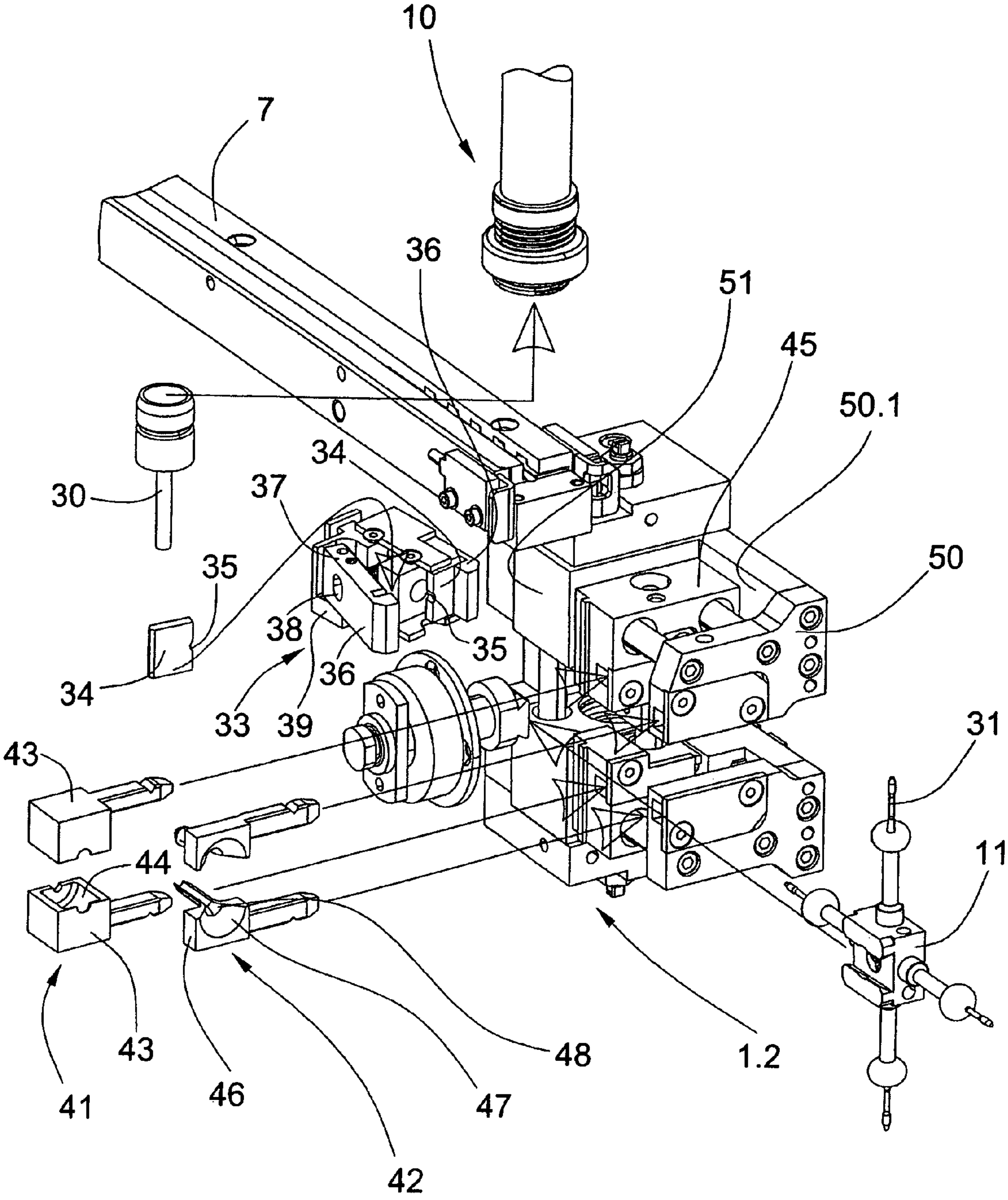

FIGS. 3 and 3*a* show details of the sleeving module 1.2. As shown in FIG. 1.1, FIG. 3, and FIG. 3*a*, the ejector device 10 is arranged above the feeder rail 7 in the axis of the one round hole 23 (FIG. 2) and the vertical round hole 24 (FIG. 4*a*-4*e*). The ejector device 10 has an upwardly and downwardly movable centering pin 30 which is drivable, for example, pneumatically. The rotating device 11 that is arranged below the feeder rail 7 has four spindles 31 which are offset from each other by an angle of 90°. The rotating device 11 can by rotated through a further angle of 90° by means of a stepping motor 32. The spindles 31 have two different diameters, the diameter in the area of the tip of the spindle being smaller. The rotating device 11 is arranged in such manner that there is always one of the spindles 31 in a first position "I" FIG. 4*a*) of the rotating device 11 that lines up flush with the vertical round hole 24 (FIGS. 4*a*-4*e*) of the feeder rail 7. Indicated with 33 is an advancing unit that has two die-plates 34, in each of which one half of a round hole 35 is arranged which in a second position "II" (FIG. 4*a*) of the rotating device 11 lines up flush with the spindle 31. The die-plates 34 are fastened to mountings 36 that can be swiveled around hinged joints 37 and are connected in a sprung manner to a support 39 via a spring 38. The advancing unit 33 can be pushed (for example pneumatically) in a straight line in the direction of the spindle 31.

A sleeving head 40 has a sleeve receptacle 41 and an expander 42. The sleeve receptacle 41 has two jaws 43, each of which has half of a cylindrical recess 44 whose size is adapted to the shape of the sleeves that are to be processed. The jaws 43 are arranged on a guide support 45 so as to be movable in radially opposite directions (for example pneumatically). The expander 42 consists of two further jaws 46, each of which has one half of a sleeve-shaped die 47 and a round hole 48 that runs through it. On the side facing away from the sleeve-shaped die 47, the round hole 48 has a funnel-shaped expansion 49 and is so dimensioned that a wire 13 (FIG. 4*a*) needing to be fitted with sleeves can be accepted. The further jaws 46 are arranged movably on a further guide support 50, and are moved simultaneous with the jaws 43, for which purpose they are mechanically connected to the jaws 43. The sleeve receptacle 41. and the expander 42 are arranged in such manner that in a further position "IV" (FIG. 4*a*) of the rotating device 11 the cylindrical recess 44 and the round hole 48 line up flush with one of the spindles 31, the further position "IV" being offset by an angle of 180° relative to the second position "II". The sleeve receptacle 41 is arranged movably (for example pneumatically) inside 4 U-shaped recess 50.1 of the further guide support 50 aligned with the axis of the cylindrical recess 44. The further guide part 50 is connected to a housing 51 which can he moved (for example also pneumatically) in the direction of the axis of the cylindrical recess 44 and the expander 42.

Figure 4A:
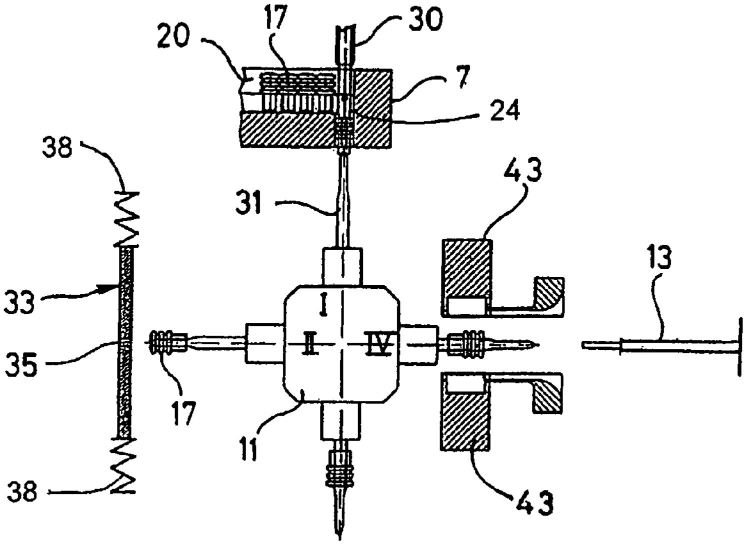
FIGS. 4*a* through 4*e* are schematic illustrations of the procedure for fitting wires with sleeves according to the present invention.
Figure 4B:
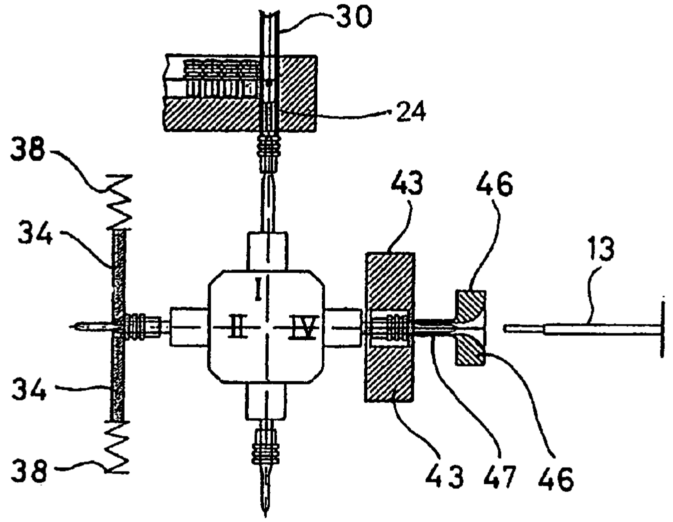
Figure 4C:
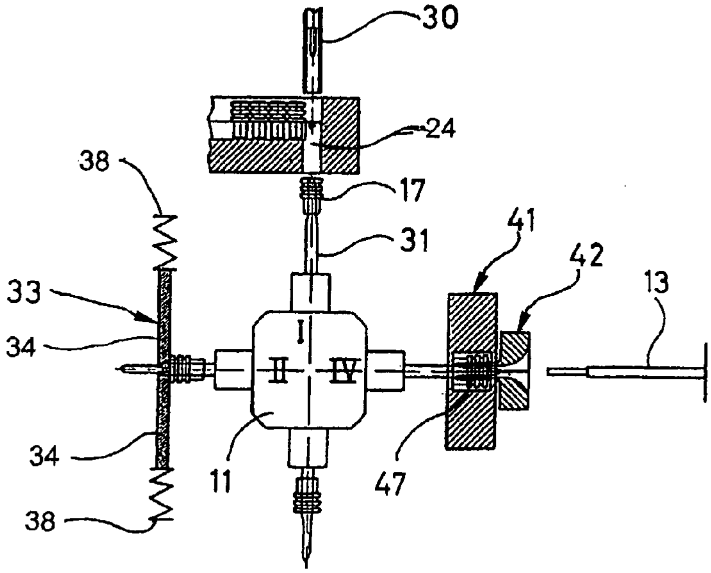
Figure 4D:
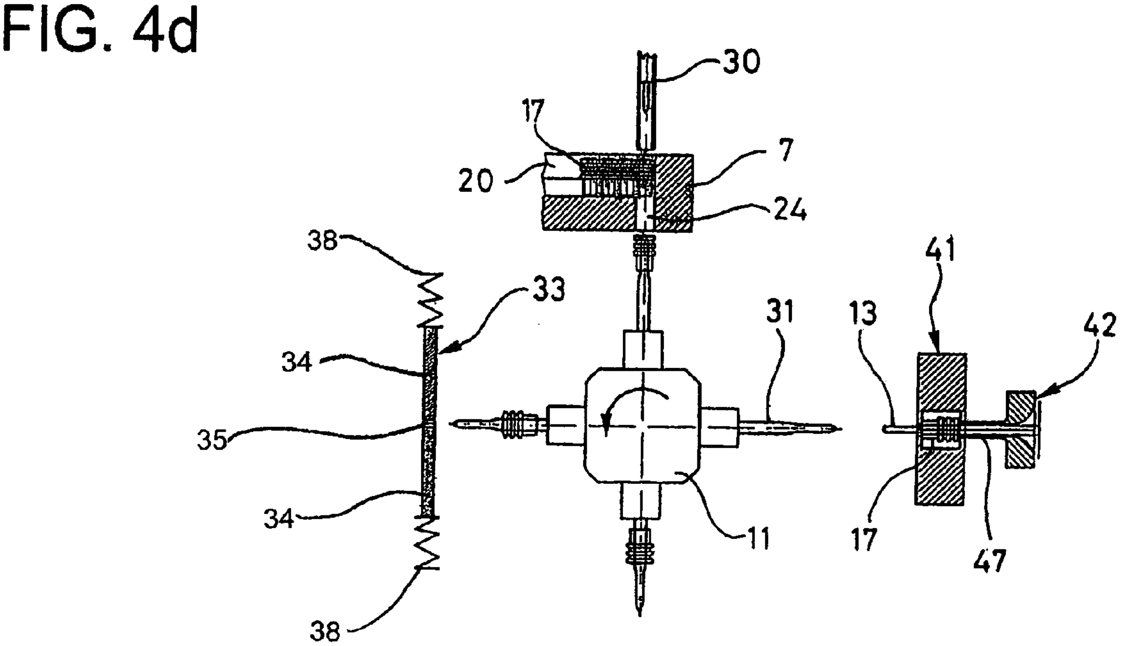
Figure 4E:
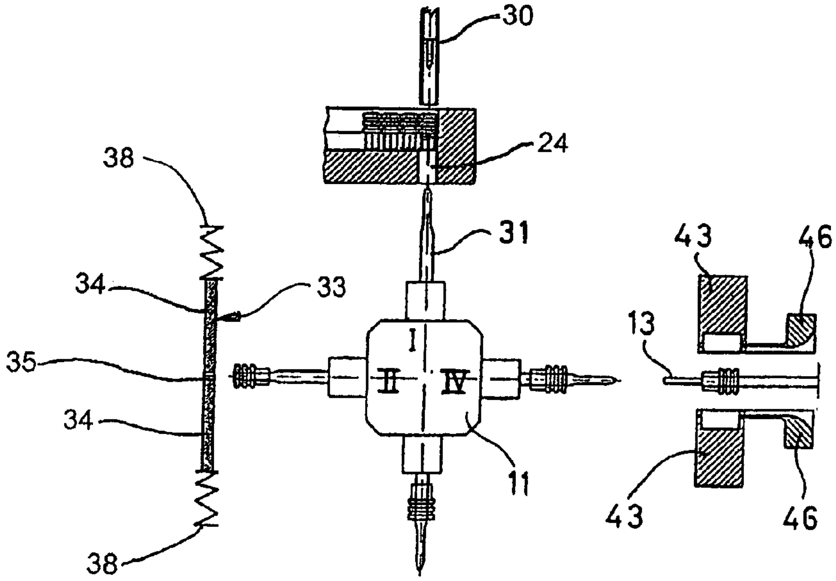

The manner in which the wire 13 is fitted with one of the sleeves 17 is as follows:

After the sleeves 17 have been buffered correctly oriented on the feeder rail 7, the first sleeve 17 in the buffter 20 is moved over the vertical round hole 24 (FIG. 4*a*). By means of the centering pin 30 of the ejector device 10, the first sleeve 17 is then pushed onto the tip of the spindle 31 that is in the first position "I: (FIG. 4*a*, 4*b*). Simultaneously, a sleeve 17 resting on a spindle that is in the second position "II" is pushed by means of the advancing unit 33 onto the thicker part of the spindle 31, as a result of which the sleeve is expanded and brought into the correct position. Since the round hole 35 is smaller than the spindle 31, the die-plates 34 are thereby caused to be pushed apart against a spring force (FIG. 4*a*, 4*b*). During the entire time, a sleeve 17 resting on the spindle 31 in the further position "IV" is embraced by the jaws 43 of the sleeve receptacle 41, the further jaws 46 of the expander 42 being thereby closed (FIG. 4*a*, 4*b*). The centering spindle 30 of the ejector device 10 is ten retracted and the sleeve receptacle 41 with the sleeve 17 pushed against the expander 42, the sleeve-shaped die 47 of the expander 42 penetrating into she round hole of the sleeve and the sleeve 17 being further slightly expanded (FIG. 4*c*). After this, the advancing unit 33 is pushed back, and by means of the sleeve receptacle 41 the sleeve 17 is pulled off the spindle 31 and transported in the direction of the wire 13. The sleeve 17 at the expander 42 is thereby held in the expanded state until the correct position on the wire 13 is reached (FIG. 4*d*). Thereupon the expander 42 is pushed relative to the sleeve receptacle 41, the sleeve 17 being thereby swept off and firmly gripping the wire 13 (FIG. 4*d*). The jaws 43 and 46 then open so that the sleeved wire 13 can be removed and a new wire fed (FIG. 4*e*). At the same time, the rotating device 11 rotates through an angle of 90°, the empty spindle 31 being thereby rotated into die first position "I" and the already sleeved, spindles 31 being rotated into the second and further positions "II" and "IV" (FIG. 4*e*).

The manner in which the sleeve-fitter 1 is retooled when changing sleeves (changing from one sort of sleeve to another sort of sleeve with sleeves of different colors and/or sleeve geometry) is as follows:

The sleeve module 1.1 contains all individual parts that are needed for fitting the wire 13 with sleeves of a certain sort of sleeve. The sleeve container 2 and the adjusted feeder rail 7 are premounted. The sleeve-specific machine parts 11, 30, 31, 34, 41, 42 are arranged on the support 3.

When changing the sleeve module 1.1, the sleeve-specific machine parts 11, 30, 31, 34, 41, 42 of the previous sleeve-fitting are toollessly dismounted and arranged on the support 3. After this, by means of the lever 1.41 the sleeve module 1.1 is unlocked and pulled off toward the back. With the drum 2.1 facing down, it can be placed in a stable position on a flat surface. Thereupon, any sleeves 17 still remaining on the feeder rail 7 fall back into the drum 2.1.

If, for the new sleeve-fitting lot, sleeves 17 with different sleeve geometries from the previous sleeve-fitting lot are required, a complete sleeve module 1.1 is placed onto the base module 1.4 (with corresponding sleeves and sleeve-specific machine parts as well as the feeder rail 7) and locked by means of the lever 1.41. For this purpose, the centering pin 1.11 is inserted into the receptacle 1.44 of the base module 1.4, all electric and pneumatic lines being thereby also (by means of the plug devices 1.12, 1.16) coupled. By means of the lever 1.41, the sleeve module 1.1 is pressed into the correct axial position and held there. Engagement of the drive pinion 5.12 with the gearwheel 1.14 takes place automatically by means of the radially sprung drive 5. Finally, the sleeve-specific machine parts 11, 30, 31, 34, 41, 42 are toollessly mounted.

Should different colored sleeves 17 be required for the new sleeve-fitting lot than for the previous sleeve-fitting lot, before laying down the sleeve module 1.1 the quick-release fastener 2.13 of the drum 2.1 is opened. After laying it down, and when all the sleeves 17 are in the drum 2.1, the sleeve module 1.1 (without drum) can be lifted out of the drum guide and inserted into a drum 2.1 with sleeves 17 of the same shape but a different color. The remainder of the mounting operation continues as described above, except that the sleeve-specific machine parts 11, 30, 31, 34, 41, 42 are already mounted.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A device for fitting electric wires with sleeves comprising:

a base module supporting a sleeve fitting module for fitting the wires with the sleeves;

a sleeve module releasably attached to said base module for correctly orienting the sleeves for use by said fitting module, said sleeve module including a container for storing a plurality of the sleeves and a feeder device for feeding the sleeves from said container to said fitting module; and plug means mounting said sleeve module on said base module.

2. The device according to claim 1 wherein said sleeve module has a housing on which is arranged a guiding and holding device which fits into a receptacle of said base module, said plug means including said guiding and holding device and said receptacle.

3. The device according to claim 2 wherein said guiding and holding device includes a centering pin with an annular notch.

4. The device according to claim 3 wherein said receptacle has a housing with a round hole into which fits said centering pin, said notch lying level with a pin in said hole and said pin being movable in said notch by a lever and a lever mechanism.

5. The device according to claim 1 wherein said sleeve module has a housing mounting a drive flange driven by a gear wheel, and a drum of said container is releasably mounted on said drive flange.

6. The device according to claim 5 wherein said gear wheel is driven by a drive arranged on said base module.

7. The device according to claim 1 wherein said sleeve module has a housing with a female plug device receiving a male plug device of said base module for connecting pneumatic and electric lines of said sleeve module to pneumatic and electric lines of said base module.

8. The device according to claim 1 wherein said sleeve module has a housing with a support accommodating sleeve-specific machine parts.

9. The device according to claim 8 wherein said sleeve-specific machine parts are mounted on, and removed from, said sleeve module without tools.

10. The device according to claim 1 wherein said sleeve module has a housing, said feeder device being mounted on said housing and including a vibratory feeder that carries a feeder rail.

11. A device for fitting electric wires with sleeves comprising:

a base module supporting a sleeve fitting module for fitting the wires with the sleeves;

a sleeve module releasably attached to said base module for correctly orienting the sleeves for use by said fitting module, said sleeve module including a container for storing a plurality of the sleeves and a feeder device for feeding the sleeves from said container to said fitting module; and means for releasably mounting said sleeve module on said base module including a centering pin on said sleeve module fitting into a receptacle on said base module.

12. The device according to claim 11 wherein said centering pin has an annular notch, said notch lying level with a pin in said receptacle and said pin being movable in said notch by a lever and a lever mechanism.

13. The device according to claim 11 wherein said sleeve module has a housing mounting a drive flange driven by a gear wheel, a drum of said container is releasably mounted on said drive flange, and said gear wheel is driven by a drive arranged on said base module to rotate said drum.

14. The device according to claim 11 wherein said sleeve module has a housing with a female plug device receiving a male plug device of said base module for connecting pneumatic and electric lines of said sleeve module to pneumatic and electric lines of said base module.

15. The device according to claim 11 wherein said sleeve module has a housing with a support accommodating sleeve-specific machine parts that are mounted on, and removable from, said sleeve module without tools.

16. The device according to claim 11 wherein said sleeve module has a housing, said feeder device being mounted on said housing and including a vibratory feeder that carries a feeder rail.

* * * * *